United States Patent [19]

Balint et al.

[11] 4,419,214

[45] Dec. 6, 1983

[54] PROCESS FOR THE RECOVERY OF SHALE OIL, HEAVY OIL, KEROGEN OR TAR FROM THEIR NATURAL SOURCES

[75] Inventors: Valer Balint; Andras Pinter; György Mika, all of Budapest, Hungary

[73] Assignees: Orszagos Koolaj es Gazipari Troszt; Budapesti Muszaki Egyetem, both of Budapest, Hungary

[21] Appl. No.: 314,050

[22] Filed: Oct. 22, 1981

[30] Foreign Application Priority Data

Dec. 23, 1980 [HU] Hungary .............................. 3091/80

[51] Int. Cl.³ ........................ C10G 1/00; C10B 53/06; C10B 57/00
[52] U.S. Cl. .................................. 208/8 R; 208/11 A
[58] Field of Search ............... 208/8 R, 11 R, 11 LE; 201/19

[56] References Cited

U.S. PATENT DOCUMENTS

| | | | |
|---|---|---|---|
| 3,449,213 | 6/1969 | Knapp et al. | 201/19 |
| 3,843,457 | 10/1971 | Grannen et al. | 201/19 X |
| 4,052,293 | 10/1977 | Mercer et al. | 208/11 R |
| 4,118,282 | 10/1978 | Wallace | 208/8 R X |
| 4,153,533 | 5/1979 | Kirkbride | 208/11 R |

*Primary Examiner*—Delbert E. Gantz
*Assistant Examiner*—Glenn A. Caldarola
*Attorney, Agent, or Firm*—Karl F. Ross; Herbert Dubno

[57] ABSTRACT

A method of recovering hydrocarbon substances such as oil and tar from naturally occurring mineral matter such as oil shale and young coal ranks, which comprises subjecting the natural mineral product to microwave irradiation in a pressure vessel through which an expelling medium is passed. The expelling medium can be gaseous or liquefied carbon dioxide containing natural or mixed gases, hydrocarbon-containing gas, vapor or liquid and gaseous or vapor-halogenated hydrocarbons.

9 Claims, No Drawings heavy oil, kerogen or tar is exposed to microwave irradiation in an closed vessel under pressure, and an expelling medium is also applied in the closed, pressure vessel. The expelling medium can be carbon dioxide-containing gas, a liquified carbon dioxide-containing natural gas, other hydrocarbon-containing gases or liquified halogenated hydrocarbons provided that the dielectric constant of the medium in question is not higher than preferably 5. The frequency of the microwave radiation is also determined. The dielectric loss coefficient of the substance applied as expelling medium should not exceed 7000. During the treatment the temperature is maintained below 500° K., and the pressure in the apparatus is held under 100 bars.

The main advantage of the new method of the invention is that the recovery ratio increases substantially. Substances which could not be isolated before can also be removed from their natural sources, and can be applied as energy source and as chemical raw materials in increased amounts, slowing down thereby the depletion of other natural hydrocarbon resources.

According to the invention the rock or alunshiffer which contains shale oil or heavy oil or the young coal rank which contains other hydrocarbons is exposed to radiofrequency irradiation, preferably microwave irradiation. Irradiation is always performed in a closed apparatus, and at the same time the expelling medium is also introduced into the vessel. Expelling mediums such as liquified carbon dioxide and, gaseous carbon dioxide, natural gases with high carbon dioxide contents, and liquid or liquified solvents, such as carbon tetrachlorides chloroform, monofluoro-trichloromethane and other chlorinated-fluorinated hydrocarbons can be applied, provided that the dielectric constant of the medium in question, measured at 3 GHz, does not exceed 5. Upon the effect of microwave irradiation the oil content of the oil shale or the tar content of the young coal can be removed. In the case of the use of carbon tetrachloride for recovery of kerogen from shale the process is like solvent extraction, well known in chemical technology, but the effect of microwave absorbtion in the rock surface causes a pregnant desorption of the kerogen from the rock.

Favorable results can be attained by the method of the invention when the frequency of the electromagnetic field is between 400 and 5800 MHz, preferably at $915\pm50$ MHz, $2375\pm50$ MHz or $2430\pm50$ MHz.

The utilization of these frequencies is of significant importance, and has the advantage in that properly selected frequencies such as the foregoing can be matched favorably to the resonance frequency of water present in or adhering to the irradiated medium (e.g. rock) for a greater recovery of oil.

The gaseous or liquid medium applied as an expelling agent in the method of the invention should have a dielectric constant not greater than 5 and a loss coefficient not greater than 7000. According to our experiences these limits have the advantage in that the ratio of the electric energy absorbed by the expelling medium is relatively low in these ranges.

Microwave energy is applied either continuously or in a pulse-like manner to the medium, and the treatment is performed for a maximum of 40 minutes.

According to the invention the temperature in the apparatus is not permitted to rise above 500° K. during the irradiation and expelling step, whereby the coking of the hydrocarbon can be avoided.

It has been observed that when the method of the invention is performed under the preferred conditions discussed above, the pressure drop of the expelling medium is between $10^{-4}$ and $10^{-1}$ bars, related to a 10 cm long section of the solid material treated. The pressure of the vessel is adjusted to a value not exceeding 10 bars, preferably to a value between 5 and 95 bars.

The method of the invention can also be performed on the natural rock itself. It is more preferable, however, to treat excavated and crushed rock. In this latter instance the dimensions of the rock particles are preferably below 1 cm. According to a preferred method of the invention the crushed rock is stirred during the treatment.

The hydrocarbon derivatives obtained in the method of the invention are then subjected to known separation steps, based on boiling point, to obtain the individual components. The major advantage of the invention is that it enables the recovery of the liquid components of shale oil, heavy oil, or tar with high efficiency (70 to 80%) without thermal degradation. The yield is always related to the organic substance content of the rock processed. At the same time, any hydrocarbon can be isolated as the endproduct, in accordance with the requirements.

It is a further advantage that the energy demand of the new method is low. When combusting a part of the recovered hydrocarbon in a Diesel engine, and coupling a generator to it, the amount of energy required to heat the rock, to effect the desorption of the hydrocarbon and to pressurize the expelling medium can easily be produced. The method of the invention is highly economical and does not require extra installations.

The invention is elucidated in detailed by the aid of the following non-limiting examples.

EXAMPLE 1

Tar sand with natural moisture content, in particles of a size of 4 to 7 mm, is placed into a microwave feeder pipe and irradiated continuously with electromagnetic waves (frequency 5.8 GHz). Simultaneously with the start of irradiation crude BTX (benzene-toluene-xylene-ethylbenzene) fraction is pumped through the sand. The extracted solution is fed into a distillation column, wherein green oil (a fraction with high naphthalene content) is obtained as head product and tar is obtained as bottom product.

The treatment is performed for 20-25 minutes.

EXAMPLE 2

Oil shale rock, crushed to fine particle size (80% of the particles are less than 1 mm in dimensions) is treated continuously for 15 to 20 minutes with electromagnetic waves (frequency 0.915 GHz). The temperature of the crushed rock does not exceed 220° C. at the end of the treament. Simultaneously with the start of irradiation carbon tetrachloride is pumped through the shale. The amount of kerogen isolated is over 65% calculated for the initial organic substance content of the rock.

Similar results are obtained when chloroform is used as the solvent.

EXAMPLE 3

Crushed lignite (90% of the particles are less than 1 cm in dimensions) is treated for 20 to 40 minutes with electromagnetic waves (frequency 0.4–1.0 GHz). The treatment is performed in pulse-like manner. At the end of the treatment the temperature of the crushed lignite

PROCESS FOR THE RECOVERY OF SHALE OIL, HEAVY OIL, KEROGEN OR TAR FROM THEIR NATURAL SOURCES

FIELD OF THE INVENTION

The invention relates to an improved method for the recovery of shale oil, heavy oil and kerogen from oil shale rocks, as well as for the recovery of tar from young coal ranks, such as brown coal, and lignite.

BACKGROUND OF THE INVENTION

Shale oil deposits can be found generally in rock shallow layers near to soil surfaces, and are regarded as valuable raw materials of the chemical industry primarily with regard to their olefin, aromatic hydrocarbon and asphaltene content.

A characteristic feature of kerogen is that it is hardly soluble, if at all, in the majority of the known and utilized organic solvents, like gasoline or naphtha. The extraction of kerogen is also difficult since it adheres firmly to the reservoir rocks and cannot be desorbed easily. The same relates to tars occurring in young coal ranks.

Various methods have been described in the patent literature for the recovery of oil from oil shales. Some of these known methods require the mining, crushing and retorting of the oil-containing rocks, whereas in other methods oil is recovered by processing, i.e. by retorting or extracting.

Thus, for example, it is known to recover kerogen from oil shale by retorting, which can be performed like the swealing of coal. In this method oil shale is heated generally to 700°-800° K., whereas coal is heated generally to a temperature of about 1000° K. Hydrocarbons undergo thermal decomposition at these temperatures. The bulk of the gas, obtained upon cooling the thermal decomposition products, consists of methane and hydrogen beside nitrogen and which is utilized as fuel. The quality of the liquid components obtained in this method does not reach the required level.

As a further disadvantage, retorting requires much heat energy, and the process can be maintained only by combusting a substantial part of the gas formed. In general, a substantial pat of oil shale should be combusted in order to heat oil shale to 800° K. and to attain the thermal dissociation of kerogen. This is the theoretical limit which determines the quality of the raw material worth processing. In practice only oil shales with a kerogen content greater than 8-10% are regarded as substances worth processing; the known and operating plants are based generally on oil shales with kerogen contents of 16 to 60%. The low heat conductivity of the rock also impedes the technical realization of retorting.

The method described in U.S. Pat. No. 4,060,479 is essentially based on dry distillation. U.S. Pat. No. 4,054,505 describes a method for the separation of oil from oil shales or bituminous sands; according to this method bitumen is isolated by the simultaneous application of solvent treatment and ultrasonic irradiation.

U.S. Pat. No. 4,054,506 relates to the improvement of the above method; in this latter method mechanical stirring of the mixture is also applied.

U.S. Pat. No. 4,067,796 describes a method for the isolation if bitumen based on the separation of an aqueous solution from organic solvents.

The so-called "coal oil" present in young coal ranks, such as lignite, and brown coal can be extracted with toluene at 350° to 400° C. temperature and 100 to 200 bar pressure, under supercritical conditions (Erdöl und Kohle, Erdgas, Petrochemie, pp. 314-326; 1980, 07.).

The method describes in the U.S. Pat. No. 4,067,616 can be regarded essentially as a transition between the in situ isolation and excavation methods, since according to the process the viscosity of kerogen is lowered with appropriate solvents and then kerogen is brought to the surface, without removing, however, the rocks covering the oil-containing rock blanket. A characteristic feature of the methods for the in situ isolation of kerogen is that the viscosity of kerogen present in the carrier rock is lowered in order to enhance the outflow of kerogen.

U.S. Pat. No. 4,045,085 describes an apparatus for the in situ isolation of oil from oil shales, utilizing retorts for fracturing oil shale. In the method described in U.S. Pat. No. 4,066,172 bitumen is isolated from the underground reservoir rocks by flowing a hot medium through the rock.

It has also been suggested to heat the reservoir rocks by electromagnetic waves in order to separate oil from oil shales. Such methods are described e.g. in French Pat. No. 1,260,264 and in U.S. Pat. No. 2,257,738. The essence of these methods is that the kerogen-containing rock is heated by radiofrequency irradiation at a wavelength which enables the energy to enter the material and to convert to heat energy directly in the material to be isolated.

The solution described in French Pat. No. 1,288,621 relates to the improvement of the above methods. According to this latter reference heat energy and high frequency electric energy are generated simultaneously in the bore formed in the oil-containing rock, whereupon the viscosity of the hydrocarbons lowers and the hydrocarbons can be extracted.

U.S. Pat. No. 3,104,711 describes a high frequency heating apparatus mounted in the production well, which enables reduction in the dielectric losses caused by the water accumulated in the bore.

The methods summarized above have not become generally acceptable, since a great deal of the electric energy introduced is absorbed in water, a substance with extremely high dielectric loss, and is consumed for the heating and evaporation of water. Further losses of energy arise from the heating of the rock; thus only a small fraction of the energy introduced serves the required purpose. As known, the distribution of energy absorption is proportional to the product of the dielectric coefficient and the mass share of the medium concerned, thus the energy fraction which serves the isolation of oil is relatively low.

The efficiencies of the above methods, as well as the recovery ratio of the hydrocarbons provided by them do not reach the theoretical optimum, the methods are uneconomical, thus they could not attain general use in practice.

OBJECT OF THE INVENTION

The object of the invention is an improved method for increasing the isolation ratio of hydrocarbons (such as shale oil, heavy oil, tar, kerogen, etc.) rendering thereby the known processes more economical.

DESCRIPTION OF THE INVENTION

According to the improved method of the invention the natural solid medium which contains shale oil, does not exceed 220° C. Simultaneously with the start of irradiation "Aromatol" (a mixture of aromatics obtained from reformed benzene) and at the same time carbon tetrechloride are pumped through the crushed lignite. Bitumen is obtained with a yield of 65%.

When the above process is repeated starting from crushed brown coal or crushed black coal, bitumen on tar is obtained with the same yield.

EXAMPLE 4

Tar sand with naturally occurring dimensions is treated continuously for 5 to 10 minutes with electromagnetic waves (frequency 5.8 GHz). The temperature of the sand remains below 250° C. at the end of the treatment. Simultaneously with the start of irradiation a mixture of Aromatol and carbon tetrachloride is pumped through the sand layer. The hydrocarbons are obtained with a yield of 80% calculated for the initial organic content.

EXAMPLE 5

Crushed oil shale (particle size distribution: 30% below 1 cm, 30% between 1 and 4 cm, 40% between 4 and 7cm) is irradiated with electromagnetic waves (frequency 0.9–2.5 GHz) for about 10 to 15 minutes. Simultaneously with this process a gas mixture rich is carbon dioxide is pressed through the shale layer. The pressure varies between 85 and 100 bars during the process. The temperature is maintained below 200° C.

Kerogen is obtained with yield of B 65% calculated for the organic substance content of the starting shale.

What we claim is:

1. A method for the recovery of a hydrocarbon product from a natural source thereof which comprises the steps of:
    (a) enclosing the mineral source in a pressure vessel;
    (b) exposing the mineral source in said pressure vessel to microwave irradiation at a frequency selected from the group which consists of 915±50 mHz, 2375±50 mHz and 2450±50 mHz;
    (c) simultaneously with the exposure of said mineral source in said pressure vessel to microwave irradiation, feeding an expelling medium selected from the group which consists of carbon tetrachloride, chloroform and chlorinated-fluorinated hydrocarbons through said pressure vessel to entrain the hydrocarbon product therefrom, said expelling medium having a dielectric constant of less than 5 at 3 GHz; and
    (d) recovering said hydrocarbon product from said medium.

2. The method defined in claim 1 wherein said medium is a fluid having a dielectric loss coefficient not greater than 7000.

3. The method defined in claim 2 wherein the microwave irradiation is applied to the mineral product in said vessel for a period up to 40 minutes.

4. The method defined in claim 3 wherein the microwave irradiation is applied by subjecting the mineral product in said vessel to continuous microwave energy.

5. The method defined in claim 3 wherein the microwave irradiation is applied by subjecting the mineral product in said vessel to microwave energy pulses.

6. The method defined in claim 3 wherein the microwave irradiation is applied at a frequency of 400 to 5800 mHz.

7. The method defined in claim 1 wherein the pressure drop of said medium through said mineral product is betwen $10^{-4}$ and $10^{-1}$ bars for a 10 cm length of the mineral product in sad vessel.

8. The method defined in claim 1 further comprising controlling the temperature of the natural mineral product in said vessel during the radiation thereof to permit the temperature to rise to a maximum of 500° K., the irradiation of said natural mineral product in said vessel being effected at a pressure below 100 bar.

9. The method defined in claim 8 wherein said pressure is between 5 and 95 bar.